United States Patent

Meier

[11] Patent Number: 5,092,551
[45] Date of Patent: Mar. 3, 1992

[54] ARTICULATED STAND

[75] Inventor: Daniel Meier, Dietikon, Switzerland

[73] Assignee: Tekusa AG, Switzerland

[21] Appl. No.: 582,953

[22] PCT Filed: Nov. 21, 1989

[86] PCT No.: PCT/CH89/00205
§ 371 Date: Sep. 18, 1990
§ 102(e) Date: Sep. 18, 1990

[87] PCT Pub. No.: WO90/06471
PCT Pub. Date: Jun. 14, 1990

[30] Foreign Application Priority Data

Dec. 9, 1988 [JP] Japan ................... 4568/88

[51] Int. Cl.⁵ .................................. E04G 3/00
[52] U.S. Cl. ........................ 248/276; 248/904;
403/56; 403/90
[58] Field of Search .............. 248/181, 276, 904, 122,
248/288.5, 481, 484; 403/55, 56, 90, 122, 58,
114, 123, 135, 63

[56] References Cited

U.S. PATENT DOCUMENTS

| 3,240,516 | 3/1966 | Barish | 403/56 X |
|---|---|---|---|
| 3,278,207 | 10/1966 | Barish et al. | |
| 3,910,538 | 10/1975 | Baitella | 248/122 |
| 4,236,844 | 12/1980 | Mantele | 403/55 |
| 4,320,884 | 3/1982 | Gardesvagen | 248/181 X |
| 4,402,481 | 9/1983 | Sasaki | 248/904 X |
| 4,431,329 | 2/1984 | Baitella | 248/276 X |
| 4,491,435 | 1/1985 | Meier | 403/55 |
| 4,606,522 | 8/1986 | Heifetz | 248/276 |

FOREIGN PATENT DOCUMENTS

| 2717828 | 10/1978 | Fed. Rep. of Germany | 403/55 |
|---|---|---|---|
| 2723361 | 11/1978 | Fed. Rep. of Germany | 403/90 |
| 3104353 | 12/1981 | Fed. Rep. of Germany | . |
| 3206789 | 12/1982 | Fed. Rep. of Germany | . |
| 458112 | 10/1913 | France | . |
| 608874 | 1/1979 | Switzerland | . |

Primary Examiner—J. Franklin Foss
Attorney, Agent, or Firm—Speckman & Pauley

[57] ABSTRACT

An articulated stand, in particular for lever gauges, having two articulated arms pivotably connected with each other at a central joint. Each articulated arm has on its end a ball joint. Each articulated arm has a clamping device for rigid clamping of all joints, which can be activated with a handle. At least one ball of the ball joints adjoins on the side of the articulated arm a support surface which is fixed with respect to the articulated arm.

14 Claims, 4 Drawing Sheets

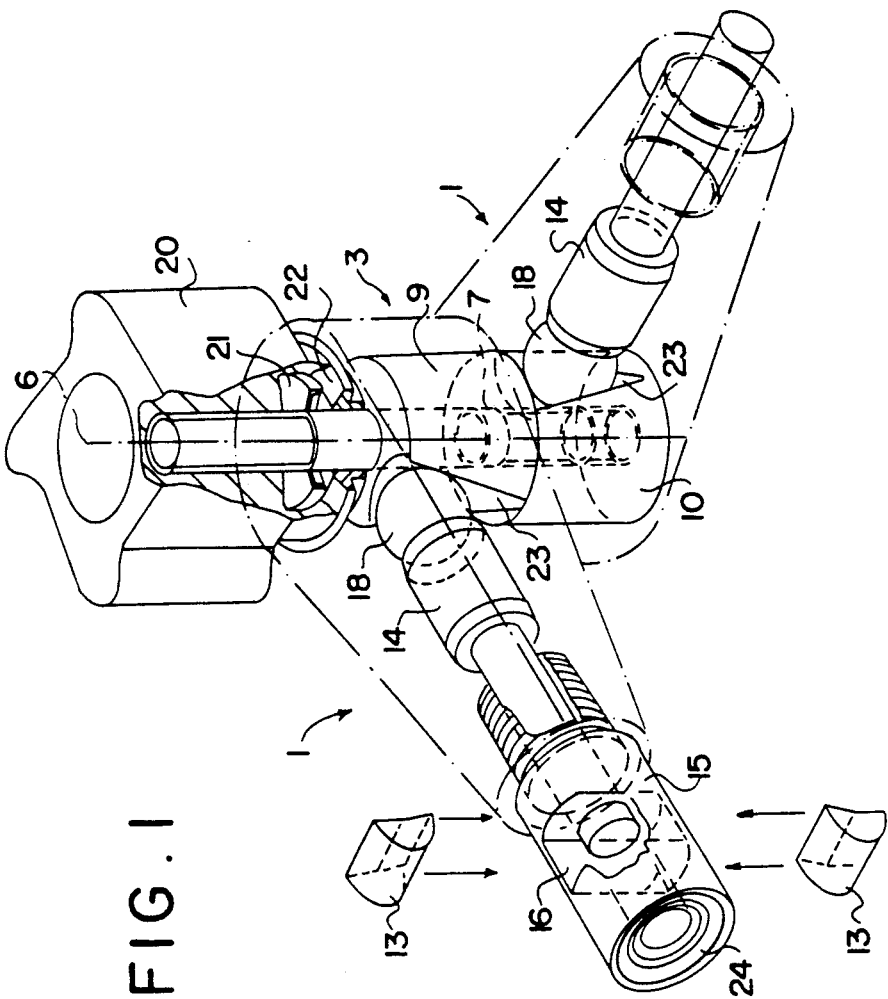
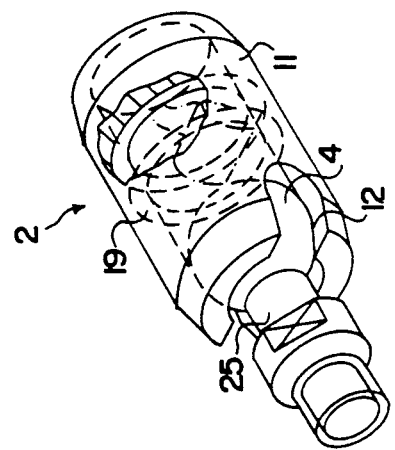
FIG. 1

ARTICULATED STAND

BACKGROUND OF THE INVENTION

The present invention relates to an articulated stand used in particular for the support of a measuring gauge. But it can also be used for any other purposes wherever an object needs to be fixed at a definite place in a definite position. Different articulated stands are already known for these purposes. They essentially consist of two articulated arms which are pivotable with respect to each other via a center joint and can be arrested in any position. The articulated arms have ball joints on their ends, the balls of which are provided with a bolt which is freely rotatable and pivotable within the degree of freedom defined by the ball joint. One of the bolts is fixedly mounted, for example, on a foot, while the other holds the item to be supported. Furthermore, the articulated stand has means for fixedly clamping the central pivot joint between the two articulated arms as well as the ball joints. There are particular clamping means which can be operated by means of a single handle, so that all the joints of the stand can be simultaneously clamped. Such articulated stands are generally employed for fixedly maintaining any items, for example for fixing parts which are intended to be soldered, glued or welded. Because of the easy release of the clamping mechanism, all joints can be moved with the same force, which is helpful for adapting a desired position of the item. But in connection with measuring gauge stations it is desired that the joints be clamped in a set sequence, which is attained by means of a particular layout of the clamping means. Mostly the known clamping means include elements with inclined bearing surfaces seated axially displaceable on the pivot axis of the two articulated arms, which can be moved in relation to each other by means of a threaded connection with at least one of these elements, which is provided with a conical surface, by use of a handle disposed on the pivot bolt. The conical oblique surfaces or bearing surfaces then act directly or indirectly on pushrods, seated longitudinally displaceable in the articulated arms, which finally clamp the balls in the ball joints with the latter.

Additionally, when pulling the handle tight, the two articulated arms are pressed against each other and clamped against each other. In a known articulated stand of this type a similar effect is attained with conical elements by means of clamping sleeves into each of which a groove extending vertically to the sleeve axis has been milled. As it were, this groove acts as a cone by serving as an abutment for a toggle lever which adjoins the pushrod with its other end. If the clamping sleeves are moved in relation to each other, the toggle levers are slightly pivoted in the abutments and therefore press on the pushrod ends. The longer the toggle levers are in this case, the greater the transfer of force and the lesser the attainable displacement path of the pushrods. In another known articulated stand, balls are used instead of toggle levers, in which case the conical elements are clamping sleeves with inclined bearing surfaces formed by conically milled grooves having a spherical cross section.

It is of course the goal of all these articulated stand devices to attain the greatest amount possible of precision and clamping force with as simple as possible a structure. The articulated stand is meant to be sturdily designed and constructed so that it can absorb as high as possible forces occurring at the ends of the articulated arms without a change of the position of the latter. So that the articulated stand, which is clamped via a single handle, is user-friendly particularly when used as a measuring gauge stand, clamping of the individual joints of such a measuring gauge stand should not take place at exactly the same time, as already mentioned. If this were the case, the clamped articulated stand would suddenly collapse upon itself when the restraint is removed. Instead, it would be helpful if, in the course of installing and clamping the measuring gauge, first the ball joint serving as the foot of the articulated stand would be clamped, then the central pivot joint and finally the ball joint which supports the measuring gauge by means of a measuring gauge support or a precise adjustment device. If the articulated stand operates in this manner, the degrees of freedom of the movement of the measuring instrument to be supported are limited step by step and additional stabilization to a certain degree is already assured. In this way it is possible to proceed step by step from rough positioning to exact setting of the position of the measuring instrument. This successive clamping of the individual joints is attained in customary devices by interposing pressure springs of different strengths between the individual transfer elements of the restraint.

The customary articulated stands are put together from a considerable number of individual parts. This makes their manufacture expensive and, if these individual parts are movable, they each cause a certain amount of variation by their movement. Every place where two movable parts abut, a transition point is created, where corresponding play is possible. But in the long run, every possible play increases the variation and results in correspondingly unstable measuring conditions at the supported measuring instrument.

SUMMARY OF THE INVENTION

It is therefore one object of the present invention to produce an articulated stand of the above mentioned type, which has with a minimum number of transition points, and is constructed of as few as possible individual parts and can create a clamping force as large as possible.

This object is attained in an articulated stand, in particular for lever gauges, having two articulated arms which are pivotably connected with each other by means of a central joint and each supporting on its end a ball joint, and having clamping means for the rigid clamping of all joints, which can be activated by means of a single handle, which is distinguished by at least one ball of the ball joints adjoining, on the side of the articulated arm, an abutment surface which is fixed with respect to the articulated arm.

BRIEF DESCRIPTION OF THE DRAWINGS

Exemplary embodiments of the articulated stand in accordance with the invention will be illustrated by means of the drawings and will be explained in detail in the ensuing description wherein:

FIG. 1 is a perspective, exploded view of the articulated stand of this invention;

DESCRIPTION OF THE PREFERRED EMBODIMENTS

Figure 2:
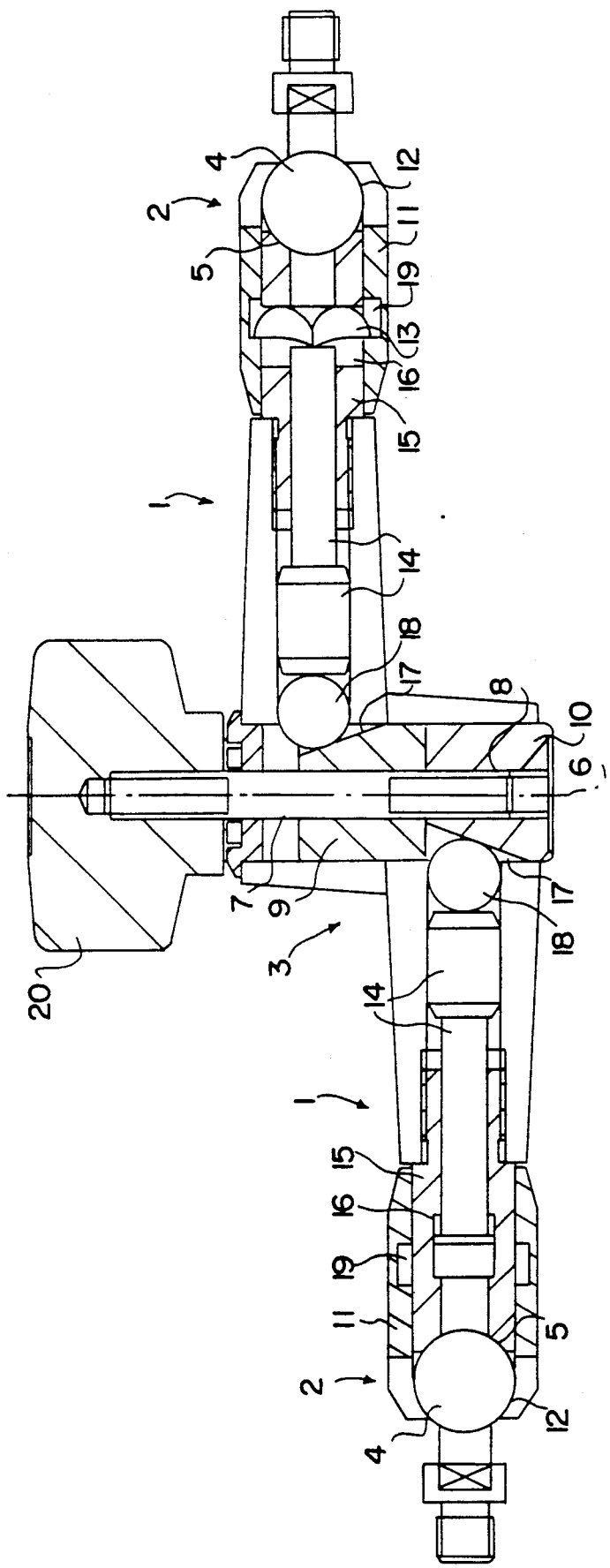
FIG. 2 is a partial sectional view of the entire articulated stand along the axes of the articulated arms.

An articulated stand in accordance with the invention is illustrated in FIG. 1 in such a way that all of its components are readily visible. There are two articulated arms 1 which are both rotatably seated on a common axis 6, the axis 6 being formed by a tension rod 7 which extends through both articulated arms 1 and forms a central pivot joint 3. A ball joint 2 is positioned on both ends of the articulated arms 1, although only one is shown in FIG. 1. Both of the articulated arms 1 have a through-bore with a considerably larger diameter than the tension rod 7. Clamping sleeves 9, 10 are guided through these bores which are, in turn, displaceably seated on the tension rod 7. The one clamping sleeve 9 is seated freely displaceable on the tension rod 7, while the other clamping sleeve 10 is seated on the tension rod 7 by means of a screw thread. The clamping sleeve 9 extends into the one as well as the other articulated arm 1, therefore is always seated in both bores simultaneously. In this way it serves as the actual bearing bolt for the central joint 3, by means of which the two articulated arms 1 are pivotable in relation to each other. A high degree of precision and stability of the pivot joint 3 is attained because of the relatively large diameter of this clamping sleeve 9 acting as a bearing bolt. The larger the diameter of the bearing bolt, the smaller a possible warp variation. A handle 20 is seated on the one end of the tension rod 7, which is firmly connected and secured with a screw thread.

Thus, when turning the handle 20, the tension rod 7 is also being turned. When tightening the handle 20, it presses on an axial pin bearing 21 which, in turn, presses on the clamping ring 22. The friction which occurs between the handle 20 and the clamping ring 22 is practically eliminated by the axial pin bearing 21, so that no moment of torque is transferred to the clamping ring 20. Because of the screw thread connection of the tension rod 7 with the clamping sleeve 10, the latter is pulled against the former when the handle 20 is tightened. Both clamping sleeves 9, 10 have conically milled annular grooves 23 which are used as seating surfaces for the balls 18, which precisely fit into the appropriate longitudinal bores in the articulated arms 1. There, the balls 18 abut against push rods 14, which are guided, longitudinally displaceable, in the longitudinal bores of the articulated arms 1. At the outer ends of the articulated arms 1, support elements 15 for the balls 4 of the ball joints 2 are fixedly connected with the articulated arms 1. These ball support elements 15 are essentially sleeve-shaped, the sleeve having a square hole 16 extending crosswise to the sleeve axis. Two cylinder segments 13 are supported in the former, which are used to transfer the pushing force of the pushrods 14. At their ends, each ball support element 16 is formed into a spherical, concave annular surface 24, into each of which the ball 4 of the corresponding ball joint 2 fits. The annular surface 24 is used as the actual ball support surface. A further sleeve 11 has been inverted over the ball 4 and further beyond the square hole 16 in the ball support element 15 over said ball support element 15. At its end, the inner edge of this sleeve 11 is formed into a spherical, concave annular surface 12, into which the ball 4 fits form-fittingly. On its interior, the sleeve 11 has an annular groove 19, on which act the edges of the cylinder segments 13, as will become clear from FIGS. 2 and 3. The balls 4 of the ball joints 2 have a bolt 25, which is either used as the support of the entire articulated stand or, on the other side, as a support for a precise adjustment device for fixing a measuring instrument, for example a lever gauge, or any tool or object.

The same, but already assembled, articulated stand as in FIG. 1 is illustrated in FIG. 2, and in section along the axes of the articulated arms, 1 the articulated arms 1 being spread at an angle of 180° with respect to each other. The articulated arms 1 are each manufactured in one piece from a hollow body.

This allows a particularly elegant and simple construction, because each hollow body can be used as the supporting member for all further fixed and movable components of the stand. In the present case, this hollow body is of a particularly simple form. It only has two through-bores of different diameters, the smaller bore being used for receiving the pushrod 14 and ending in the larger bore, in which the clamping sleeves 9, 10 are guided. The one clamping sleeve 9 simultaneously acts as bearing bolt for the central pivot joint 3, as can be seen very clearly here. The two clamping sleeves 9, 10 are positioned in tandem. Thus, they always move at the same time in the same direction and always tightly contact each other. Automatic compensation of the clamping forces at each clamping joint is no longer provided by this layout, as is the case when the clamping sleeves are displaced in relation to each other in order to obtain clamping. But the simultaneous clamping with a clamping force which is the same all over has proven itself to be no longer a basic requirement in the embodiment as a measuring gauge stand. Instead, clamping of the individual joints in a set sequence is much desired with measuring gauge stands, as stated before. This is exactly what is realized with the least number of components by means of the tandem arrangement of the clamping sleeves and, as should be well noted, without any pressure springs at all. As can be seen in FIG. 2, the clamping sleeves 9, 10 have conical surfaces 17 which adjoin the balls 18. If the clamping sleeves 9, 10 are moved in the direction towards the handle 20, the balls are pressed into the bores of the articulated arms 1 by the conical surfaces 17, by means of which the clamping force is transferred to the pushrods 14. The pushrods 14 extend through the ball support elements 15 into the square hole 16, which extends crosswise through said ball support elements 15. The front faces of the pushrods 14 act on the peripheral segmental intersecting edge of two cylinder segments 13 inserted into the square hole 16. Each of the cylinder segments 13 forms a segmental cut from a cylinder enclosing an angle greater than 180°. In this case the cylinder diameter is greater than the outer radius of the ball support element 15. Because of this, the opposite peripheral edge of the cylinder segments 13 extends beyond the ball support element 15. It extends there into an annular groove 19 removed from the interior of a sleeve 11 which has been inverted from the outside over the ball 4 of the ball joint 2. The inside edge of this sleeve 11 is made spherically and concave at the end, so that the sleeve 11 is narrowed there on its inside and an annular surface 12 is formed, against which the ball 4 form-fittingly abuts. The said cylinder segments 13, when acted upon by the pushrods 14 with a pushing force, act like a swing, so that an appropriate pushing force acts in the opposite direction on the annular groove 19 of the sleeve 11. The ball support element 15 always remains fixedly connected with the articulated arm 1 or its hollow body, because it is screwed to it. By means of the pushing force acting on the annular groove 19 of the sleeve 11, the latter is pulled in the direction towards the articulated arm 1 and therefore presses the ball 4 against the ball support element 15 which, on the side towards the ball, 4 also has a spherical, concave annular surface 5 against which the ball 4 is being pressed form-fittingly.

Figure 3:
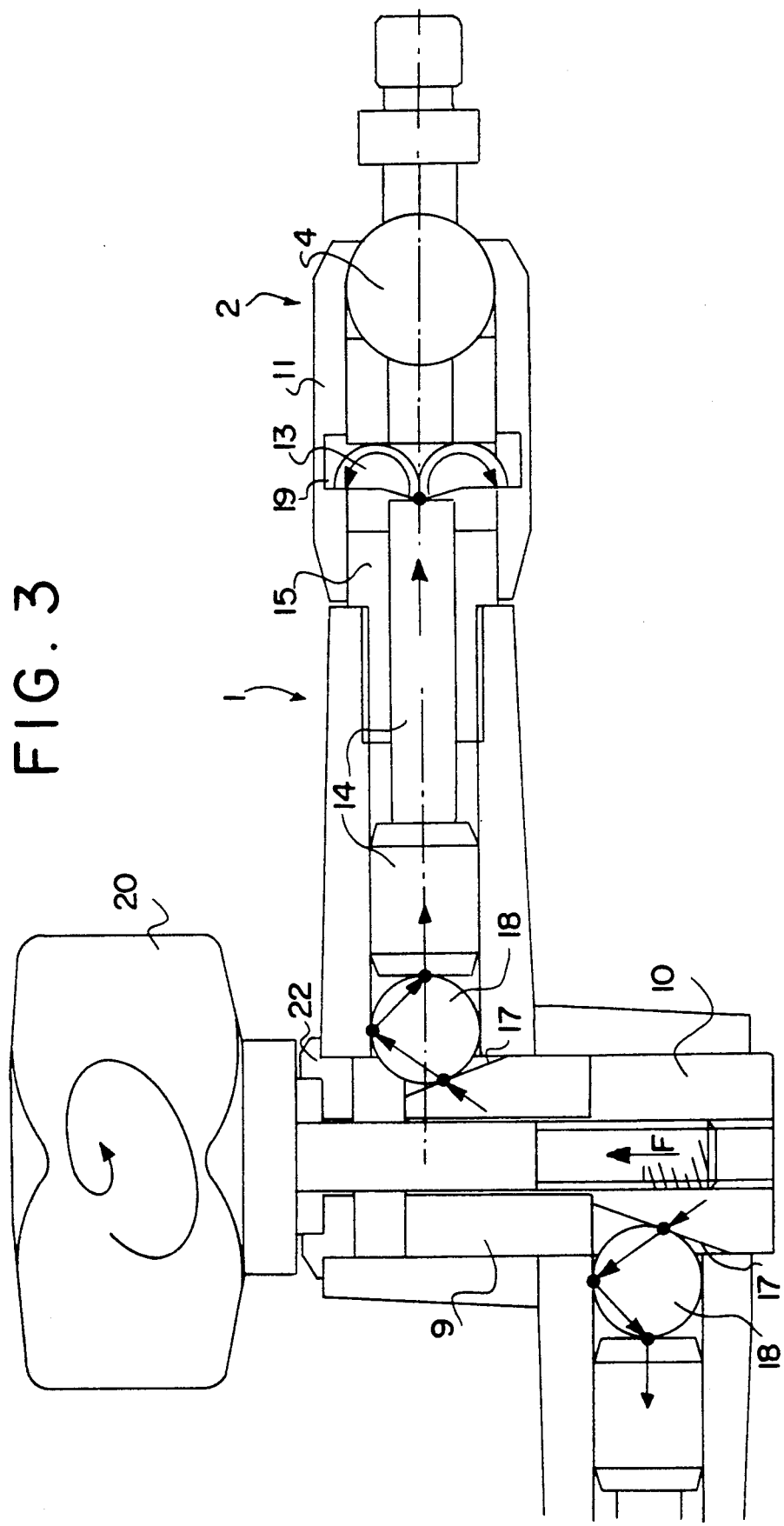
FIG. 3 is a portion of FIG. 2 with the force flow illustrated by arrows.

FIG. 3 particularly clearly shows the flow of force on an individual articulated arm. The original clamping force F, generated by the manipulation of the handle 20, pulls the clamping sleeve 10 in the direction towards the handle 20. The reaction force is transmitted from the clamping ring 22 to the hollow body of the articulated arm 1, but has not been drawn in here, the same as all other reaction forces. Then the clamping force F is passed on to the balls 18 by means of the conical surfaces 17, as shown by the arrows. This takes place with the least tolerance play, if the forces are distributed on the ball 18 along an as long as possible peripheral line. For this reason the conical surfaces 17 are advantageously in the form of conically milled annular grooves, the radius of which corresponds to that of the ball 18. Because of this, the ball 18 always rolls on a line of contact in the groove. On the other hand, the ball 18 and the bore in the articulated arm 1 are of such dimensions that the ball 18 fits as exactly as possible into the bore. Then the reaction forces in the articulated arm 1 appear along a peripheral line extending approximately around 180°. The ball 18 passes the clamping force on to the pushrod 14 which, in turn, acts on the peripheral edges or segmental intersecting edges of the two cylinder segments 13. The reaction forces are provided by the ball support element 15 which is fixedly connected with the hollow body. Similar to a swing, each cylinder segment 13 deflects the force to the sleeve 11 by pressing on the annular groove 19 of the latter with its other peripheral edge. By means of this the sleeve 11 is finally pulled against the ball 4, because of which the ball joint 2 is clamped. With this new type of clamping it is possible to reduce the tolerance play further in comparison with customary constructions. The position of the ball 4 is always defined by its abutting against the rigid ball support element 15, which is fixedly screwed to the hollow body of the articulated arm 1. Thanks to this construction, it is possible to make the ball support element 15 of such a size that it can absorb the pushing and normal forces acting in its interior without problems. In customary constructions, the ball of the ball joint is mainly pushed away directly or indirectly by the pushrod from the articulated arm and against the sleeve surrounding it. A conflict in goals arises between the necessary reduction of the tolerance, on account of the flexibility of the sleeve, and the reduction of the structural size or diameter of latter. With a given reduced diameter of the sleeve 11, the play which can be attained in the tolerance is noticeably reduced with the construction in accordance with the invention.

To perform the clamping of the individual joints 2, 3 in an embodiment in the form of a measuring gauge stand in a defined sequence, it is not necessary to employ pressure springs in the articulated stand in accordance with the invention, which does away with additional components. Control of the sequence of the individual clampings is exclusively provided by small variations in the length of the built-in clamping sleeves 9, 10 and pushrods 14. If, for example, the clamping sleeve 9 is slightly shortened on the order of tenths of millimeters, clamping of the central hinge joint 3 takes place later than that of the ball joint 2, which is causally clamped by the movement of the clamping sleeve 10. By shortening the length of the pushrod 14 acting on the other ball joint, the clamping of the latter takes place later in comparison with that of the central hinge joint 3.

Figure 4:
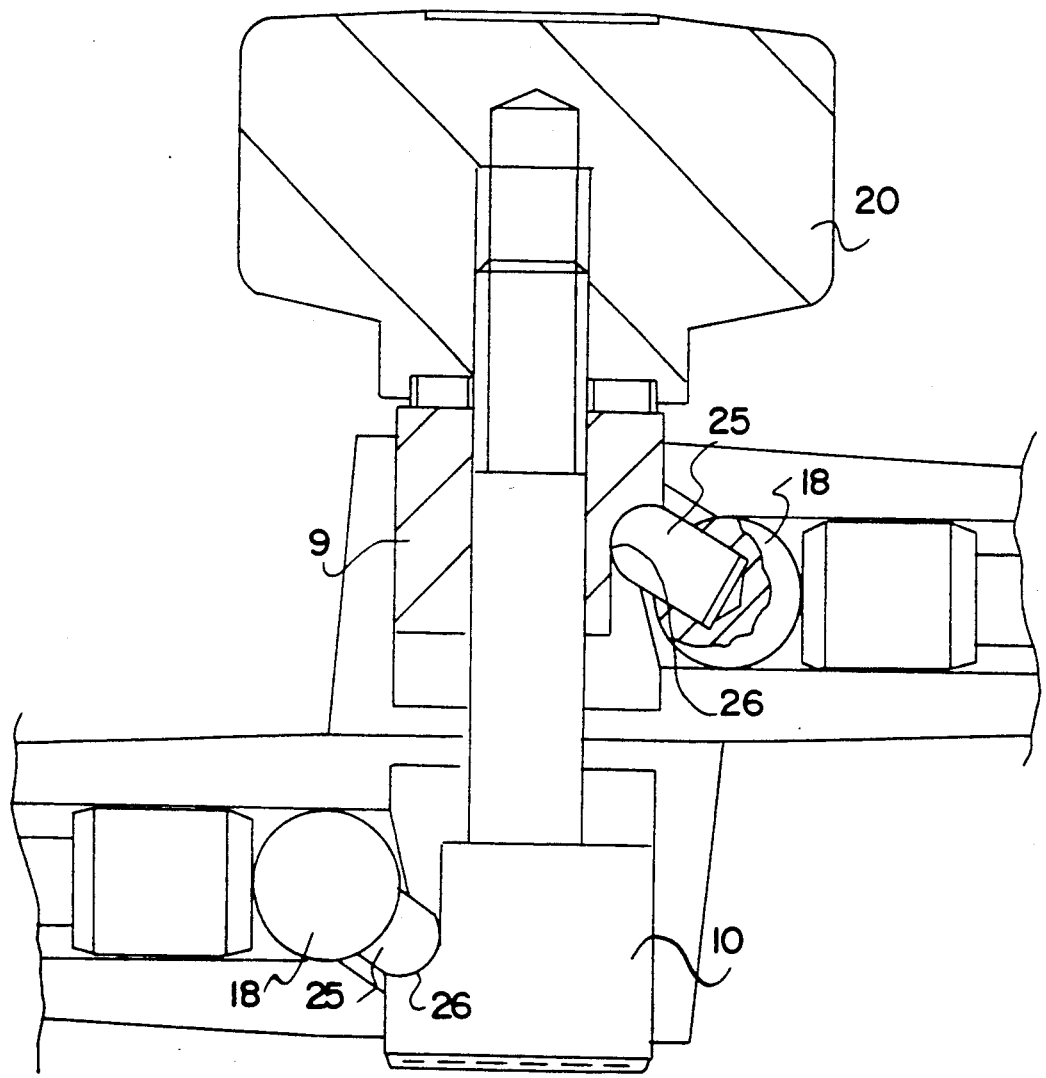
FIG. 4 is a partial sectional view of a variant of the central pivot joint with abutments in the clamping sleeves.

FIG. 4 illustrates an alternate construction of the clamping mechanism in an articulated stand in accordance with the invention. This clamping mechanism is particularly suitable if it is intended to equalize the clamping forces at all joints, if needed, or if the clamping force is to be particularly great. The bearing surfaces on the clamping sleeves 9, 10 are provided here by grooves milled crosswise to the clamping sleeve axis, which are used as abutments for cams 25 fitting into them. The cams 25 are inserted as bolts into the balls 18 and increase the toggle lever effect on the pushrods 14, otherwise already provided by the balls, 18 by acting as toggle levers.

In general, less components are required because of the novel construction of the articulated stand. Assembly and disassembly are considerably simplified, which also contributes to less expensive manufacturing. Structural and also esthetic advantages are provided by the use of a rigid, closed body as the supporting and functional part of each articulated arm 1, because the clamping mechanism can be housed in each body invisible from the outside. Besides their function during clamping, the particularly large-sized clamping sleeves 9, 10 perform a stabilizing function. Their large friction surfaces permit a particularly stable clamping of the central hinge joint 3 of the two articulated arms 1 and thus guarantee optimum safety against torsion. Particularly because the one clamping sleeve 9 connects both articulated arms 1 in the form of a bearing bolt, it also performs an important centering function. The size of this bearing bolt not only contributes to safety against torsion, but also stability against warping. The large-sized balls 18 also have a strong functional effect. Not only are they force transfer elements particularly low in friction but, similar to a toggle lever, they act as force transmitters by increasing the clamping force acting on the ball joints. Finally, the permanent support of the balls 4 of the ball joints 2 on the support elements 15, which are fixedly connected with the articulated arms 1, provides an absolutely direct connection free of play. In this way the balls 4 are always maintained free of play and unsteadiness.

I claim:

1. An articulated stand, in particular for lever gauges, having two articulated arms (1) pivotably connected with each other by means of a central joint (3) and each supporting on its end a ball joint (3), and having clamping means for rigid clamping of all joints (2, 3), which can be activated by means of a handle (20), the improvement comprising: at least one ball (4) of the ball joints (2) adjoining on the side of the articulated arm, a support surface (5) which is fixed with respect to the articulated arm (1).

2. An articulated stand in accordance with claim 1, wherein the clamping means for clamping the ball joint (2) include a sleeve (11), which can be inverted over the ball (4) in a direction toward the articulated arm (1), the one inner edge (12) of which is in a form of a spherical inner surface enclosing the ball (4) along an annular segment, and means are provided for the sleeve (11) to be clamped in the direction toward the articulated arm (1).

3. An articulated stand in accordance with claim 2, wherein the means for clamping the sleeve (11) comprise deflection means (13) through which it is possible to change an axial pushing force, acting towards an outside, of a pushrod (14) seated in the articulated arm (1) into a pushing force reversed by 180°, by means of which the sleeve (11) can be clamped with respect to the articulated arm (1).

4. An articulated stand in accordance with claim 3, wherein the support surface (5) for the ball (4) is formed by a ball support element (15), which is fixedly connected with the articulated arm (1) and has a square hole (16) crosswise to a longitudinal direction of the articulated arm (1), in the square hole (16) cylinder segments (13) are seated in a symmetrical arrangement to form deflection means (13) so, that one of their peripheral segmental intersecting edges can be acted upon with pressure by the pushrod (14), each segment (13) abutting with its cylindrical wall on the ball support element (15), and the sleeve (11) being acted upon with a pushing force in the direction towards the articulated arm (1) by means of its opposite peripheral segmental intersecting edge.

5. An articulated stand in accordance with claim 4, wherein the two articulated arms (1) are each constructed from a one-piece hollow body as the supporting element, which contains in an interior elements for transmission of the pushing force so they cannot be seen.

6. An articulated stand in accordance with claims 5, wherein a tension rod (7) with a clamping screw thread (8) on its end, defining a pivot axis (6) extending through the articulated arms (1), the tension rod (7) supports two clamping sleeves (9, 10) placed in tandem against each other, one clamping sleeve (10) is a threaded sleeve seated on the clamping screw thread (8) of the tension rod (7), and another clamping sleeve (9) is displaceably seated on the tension rod (7) between the two articulated arms (1) and acts as a bearing bolt.

7. An articulated stand in accordance with claim 6 wherein the sleeve (11) has on its inside an annular groove (19) on which the cylinder segments (13) are intended to act with one of their peripheral segmental intersecting edges.

8. An articulated stand in accordance with claim 7, wherein each of the clamping sleeves (9, 10) has one of plane and inwardly cylindrically arced roll-off surfaces (17) and abutments (26), on which the roll-off surfaces (17) abut one of the balls (18) and abutments (26) are used as hinge points for cams (25) formed on the balls (18), one of said balls and said balls (18) provided with cams (25) acting as transmission elements for transmission to the pushrods (14) of the pushing force provided by the clamping sleeves (9, 10).

9. An articulated stand in accordance with claim 8, wherein the ball (18) closely fits into a bore in the articulated arm (1), so that the reaction force acting on it from the articulated arm is distributed on a generating line enclosing the ball (18) over 180°.

10. An articulated stand in accordance with claim 9, wherein one of the inwardly cylindrically arced roll-off surfaces (17) on the clamping sleeves (9, 10) are conically cut-out annular grooves, and the inwardly cylindrically arced abutments (26) on the clamping sleeves (9, 10) are each formed by a groove cut out crosswise to the clamping sleeve axis (6).

11. An articulated stand in accordance with claim 1, wherein the two articulated arms (1) are each constructed from a one-piece hollow body as a supporting element, which contains in an interior elements for transmission of a pushing force so they cannot be seen.

12. An articulated stand in accordance with claim 1, wherein a tension rod (7) with a clamping screw thread (8) on its end, defining a pivot axis (6) extending through the articulated arms (1), the tension rod (7) supports two clamping sleeves (9, 10) placed in tandem against each other, one clamping sleeve (10) is a threaded sleeve seated on the clamping screw thread (8) of the tension rod (7), and another clamping sleeve (9) is displaceably seated on the tension rod (7) between the two articulate arms (1) and acts a bearing bolt.

13. An articulated stand in accordance with claim 1, wherein a sleeve (11) which can be inverted over the ball (4) has on its inside an annular groove (19) on which cylinder segments (13) are intended to act with one of their peripheral segmental intersecting edges.

14. An articulated stand in accordance with claim 8, wherein one of the inwardly cylindrically arced roll-off surfaces (17) on the clamping sleeves (9, 10) are conically cut-out annular grooves and the inwardly cylindrically arced abutments (26) on the clamping sleeves (9, 10) are each formed by a groove cut out crosswise to the clamping sleeve axis (6).

* * * * *

UNITED STATES PATENT AND TRADEMARK OFFICE
CERTIFICATE OF CORRECTION

PATENT NO. : 5,092,551
DATED : March 3, 1992
INVENTOR(S) : Daniel Meier

It is certified that error appears in the above—identified patent and that said Letters Patent is hereby corrected as shown below:

On the cover page of the Patent, in the "Foreign Application Priority Data" section, delete "Japan" and in its place insert --Switzerland--.

Signed and Sealed this

Twenty-fourth Day of August, 1993

Attest:

BRUCE LEHMAN

*Attesting Officer*　　　*Commissioner of Patents and Trademarks*